United States Patent [19]
Stiegler et al.

[11] Patent Number: 5,522,470
[45] Date of Patent: Jun. 4, 1996

[54] TRIM COMPENSATION FOR A HOVERCRAFT

[76] Inventors: Hartmut Stiegler, Krefelder Strasse 840, 41066 Mönchengladbach, Germany; Albert Blum, 3, chemin des Chênes, CH-2072 St. Blaise, Switzerland

[21] Appl. No.: 356,390
[22] PCT Filed: Jun. 16, 1993
[86] PCT No.: PCT/DE93/00526
 § 371 Date: Feb. 23, 1995
 § 102(e) Date: Feb. 23, 1995
[87] PCT Pub. No.: WO93/25420
 PCT Pub. Date: Dec. 23, 1993

[30] Foreign Application Priority Data

Jun. 17, 1992 [DE] Germany ............ 42 19 828.3

[51] Int. Cl.⁶ .................. B60V 1/11; B60V 1/14
[52] U.S. Cl. .............. 180/117; 114/67 A; 440/37
[58] Field of Search ................. 180/116, 117, 180/127, 121; 440/37

[56] References Cited

U.S. PATENT DOCUMENTS

| | | |
|---|---|---|
| 3,587,771 | 6/1971 | Faure ............... 180/117 |
| 4,249,628 | 2/1981 | Longley ............. 180/117 |
| 4,421,489 | 12/1983 | Van Veldhuizen ....... 440/37 |
| 5,097,919 | 3/1992 | Cox ................. 180/117 |
| 5,370,197 | 12/1994 | Goodwin et al. ...... 180/117 |

FOREIGN PATENT DOCUMENTS

| | | | |
|---|---|---|---|
| 178857 | 8/1991 | Japan ............. | 180/117 |
| 603190 | 3/1982 | U.S.S.R. .......... | 180/117 |

*Primary Examiner*—Mitchell J. Hill
*Attorney, Agent, or Firm*—David R. Syrowik

[57] ABSTRACT

Trim compensation for a hovercraft having two engines (2,3) with flow outlet apertures. The two engines (2,3) are arranged laterally at the stern of the hovercraft to generate air jets for forward motion. The hovercraft also includes a compressor to generate an air cushion beneath the hovercraft. The trim compensation includes a tail plane arrangement located in the air jets in the two engines for directional control of the hovercraft by deflection of the air jets. The tail plane arrangement consists of a negatively arranged V-plane (7) with a middle upper section from which extends stabilizer surfaces (9,10) at both sides in a downward direction. The stabilizer surfaces (9, 10) are provided with rudder elements (11, 12) which are swingable in the same or opposite direction to deflect the air jets. The stabilizer surfaces (9, 10) and the rudder elements (11, 12) run centrally across the flow outlet apertures of the engines (2, 3). The rudder elements (11, 12) are swivelled about an axis of rotation in addition to the directional control to produce an additional force component for trim compensation which is generated by the additional deflection of the air jets of the two engines (2, 3) and which is constantly superimposed on the directional control.

9 Claims, 4 Drawing Sheets

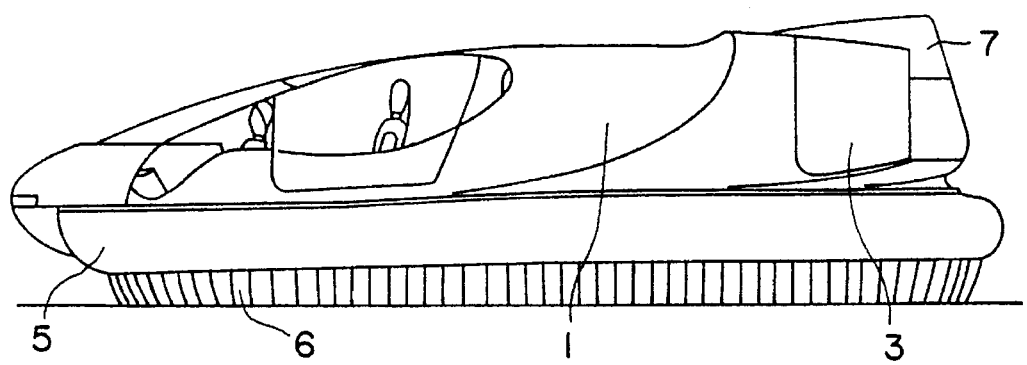
FIG. 2  ← DIRECTION OF TRAVEL →
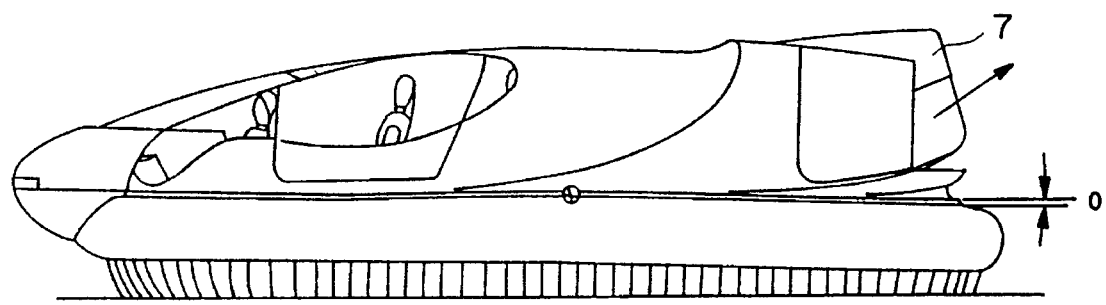
FIG. 3

TRIM COMPENSATION FOR A HOVERCRAFT

TECHNICAL FIELD OF THE INVENTION

The invention relates to a trimmer for a hovercraft with two engines to provide forward motion, an air compressor to generate the air-cushion beneath the craft and a stabiliser arrangement at its stern.

BACKGROUND ART

Hovercraft are generally fitted with a compressor to generate the necessary air-cushion within a rubber skirt and at least one drive engine for taking straight and/or curve courses. When a curve course is taken, the hovercraft is usually steered by laterally deflecting the jet of air with a lateral rudder, such as is familiar from aircraft construction.

In such hovercraft, the bodywork tilts about the longitudinal axis of stability, the transverse axis of stability or both axes simultaneously, if the centre of gravity shifts due to varying or non-uniform loading with passengers or cargo, for example.

In the worst case, this inclination about one of the axes of stability, caused by a shift in the centre of gravity, can cause the rubber skirt of the hovercraft to dip into the water while travelling. In this case, the rubber skirt would be compressed to a more or less pronounced degree and the buoyancy of the air-cushion reduced in this area. The consequence of this is that the hovercraft dips even further into the water and could even flip over.

Another effect which occurs following a shift in the centre of gravity is thoroughly comparable to the effect of side-winds. This effect arises as a result of the varying gap between the rubber skirt and the ground or the surface of the water and the resultant varying release of the air from the air-cushion. The force component arising in this context pushes the hovercraft in the direction of the shift in the centre of gravity.

In principle, measures to compensate for the shift in the centre of gravity in hovercraft are possible by using additional trimming weights, for example. However, these measures lead to an additional weight load and, thus, to increased energy consumption.

SUMMARY OF THE INVENTION

A steering gear for a hovercraft is described in U.S. Pat. No. 4,249,628 with two fans arranged next to each other at the stern for forward motion. Flaps similar to ailerons are arranged in pivotable fashion about a horizontal axis within an air duct in the air jet downstream of each of the fans which can be moved between a normal position, in which their plane runs parallel to the axis of the air duct, and a fully effective position in which the flaps are positioned transversely, meaning that they almost totally block the air jet. In order to trim the hovercraft about its transverse axis, the aileron-type flaps can be moved upwards or downwards in synchrony. However, this method of trimming is difficult to realise and is only sufficiently effective when taking a straight course.

The underlying task of the invention is therefore to provide a trimmer for a hovercraft, which can be made with simple means and is capable of largely compensating for a shift in the centre of gravity.

The invention relates to a trimmer for a hovercraft with two engines arranged laterally at the stern to generate forward motion, a compressor to generate an air-cushion beneath the craft and a stabilizer arrangement located in the air jet of the engines.

The underlying task of the invention is solved in that the stabilizer arrangement comprises a negatively arranged V-plane whose downwardly directed stabiliser surfaces, which are each fitted with a rudder element, run centrally through the flow outlet apertures of the engines and that an additional force component is generated by additional deflection of the air jets of both engines, which is constantly superimposed on the directional control.

By means of the invention, it is possible to keep the hovercraft in a largely horizontal position by simple means and with a high degree of sensitivity, even in the event of a shift in the centre of gravity. The above-mentioned disadvantages can then no longer occur. The invention particularly improves the safety of the moving craft. Drift, which would otherwise occur as a result of the hovercraft tilting about one of the axes of stability and is comparable to the effects of a side-wind, is thus avoided.

In the event of the hovercraft being down by the head or the stern, the air jets are additionally deflected in such a way that the craft is trimmed about the longitudinal axis of stability. In all other cases, the additional deflection is controlled in such a way that the craft is trimmed about the transverse axis of stability.

In a further version of the invention, the air jets are additionally deflected in such a way that the craft is simultaneously trimmed about the transverse and longitudinal axes of stability.

In a different version of the invention, the air jet of one engine or the air jets of both engines are deflected while the hovercraft is stationary or moving slowly until the craft reaches a horizontal position. It is thus easily possible to constantly compensate for the shift in the centre of gravity, for instance when the hovercraft is being boarded.

The rudder elements of the V-plane are set in the same direction in order to trim the craft about the transverse axis of stability, or in opposite directions in the event of trimming about the longitudinal axis of stability. The value of this setting is superimposed as a constant value on all other rudder angles.

It is also easily possible to trim the hovercraft by a simultaneously setting the rudder elements of the V-plane in the same or opposite directions.

BRIEF DESCRIPTION OF THE DRAWINGS

The invention is described in detail below on the basis of a practical example. The associated drawings show the following:

FIG. 2 A side view of the hovercraft in normal position;

FIG. 3 A side view of the hovercraft trimmed down by the stern;

DESCRIPTION OF THE PREFERRED EMBODIMENT(S)

Figure 1:
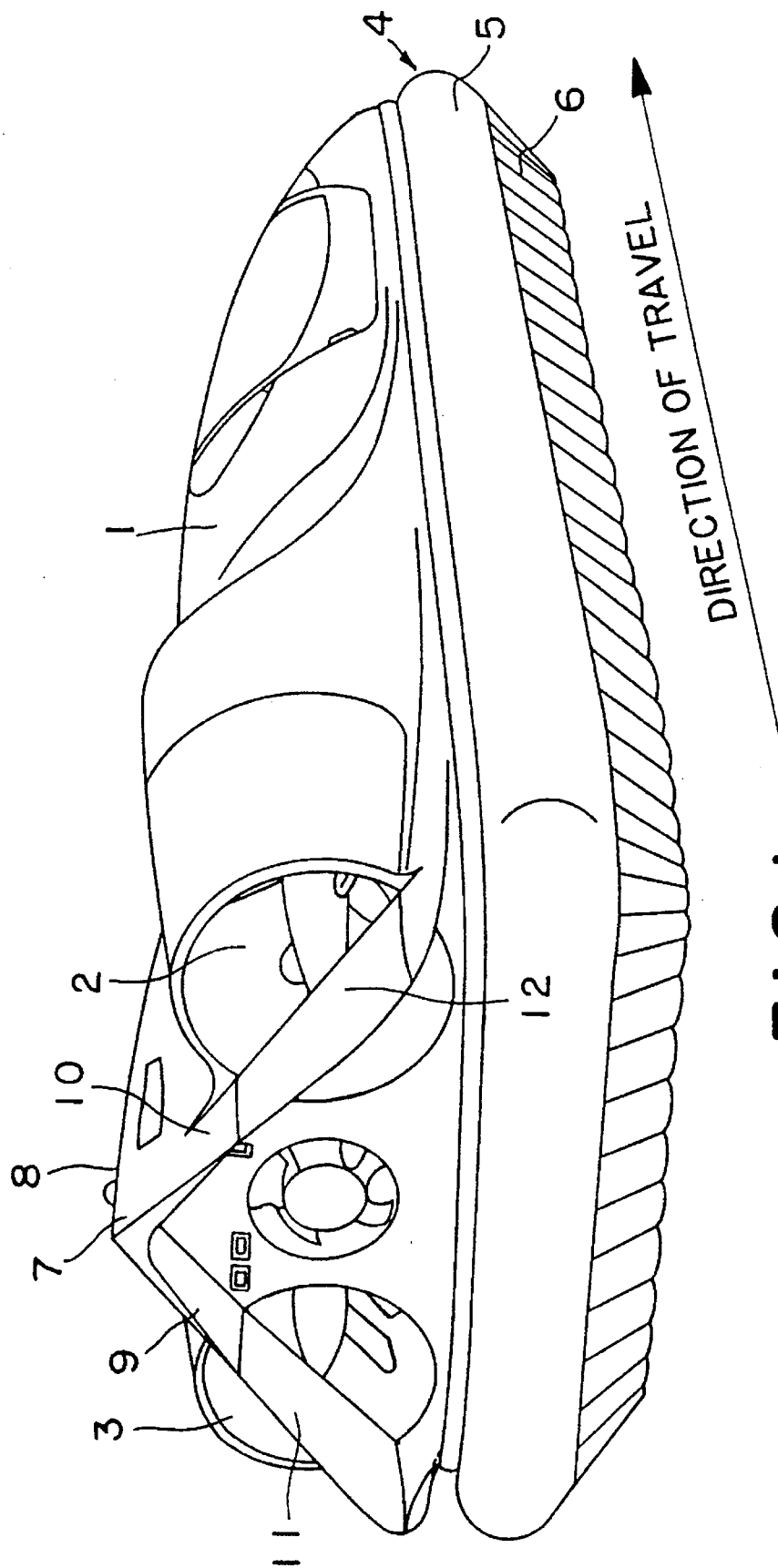
FIG. 1 A perspective rear view of a hovercraft with a negative V-plane.

FIGS. 1 and 2 show a hovercraft fitted with two laterally arranged engines 2, 3 at the stern of the bodywork 1 in order to generate forward motion. A peripheral rubber skirt 4 is fitted to the bottom of the bodywork 1, comprising a back skirt 5 and a flexible finger skirt 6. Furthermore, a negative V-plane 7 is located behind the engines 2, 3, the upper middle section of which is designed as a stabilising nose 8, which protrudes beyond the contour of the bodywork 1 and serves to improve the directional control of the hovercraft when taking a straight course, particularly at higher speeds.

In this context, the V-plane 7 is designed in such a way the two downwardly directed stabiliser surfaces 9, 10 extend centrally across the engines 2, 3. Furthermore, the stabiliser surfaces 9, 10 are provided with rudder elements 11, 12, which extend across the entire diameter of the engines. The rudder elements, 11, 12, which display a symmetrical profile, can be swivelled up or down about an axis of rotation which is not shown and which passes through the thickest part of the rudder elements 11, 12.

In order to take a curve course, the rudder elements 11, 12 are set in opposite directions to each other. If, for example, the left-hand rudder element 11 is swivelled upwards and the right-hand rudder element 12 is swivelled downwards by the same amount, a left-hand curve is taken.

When taking a straight course without additional trimming, the rudder elements 11, 12 are set to their neutral position, in which they each create a single surface together with the stabiliser surfaces 9, 10. The air blown out of the engines is not deflected at all in this position (FIG. 2, 4).

Figure 5:
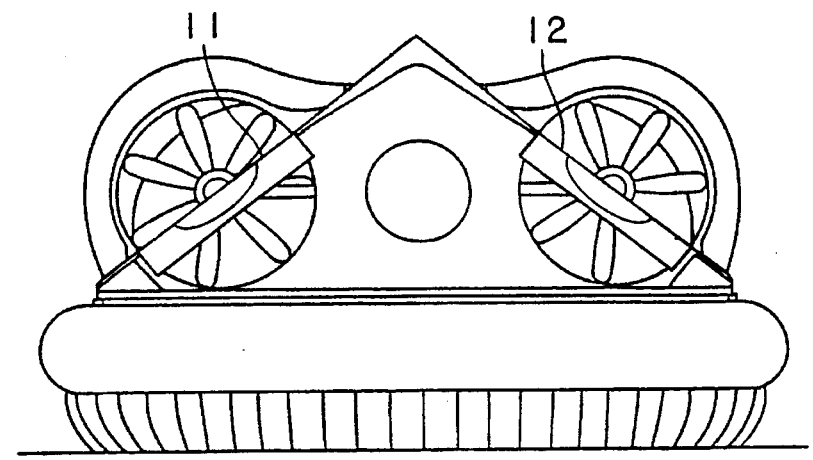
FIG. 5 A rear view of the hovercraft trimmed down by the head.
Figure 6:
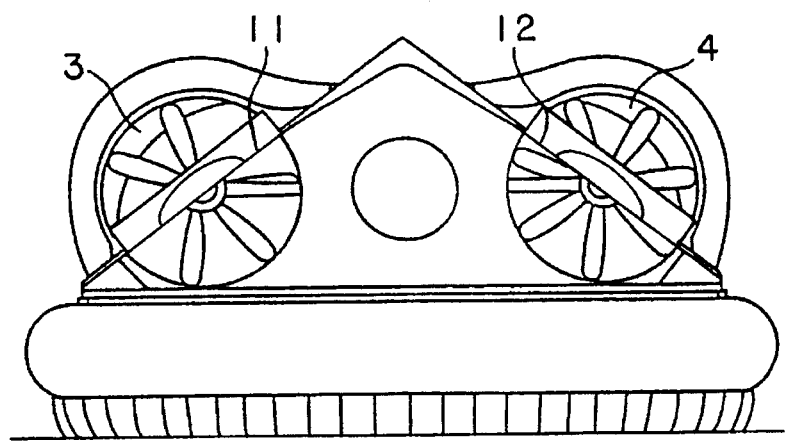
FIG. 6 A rear view of the hovercraft trimmed down by the stern.

FIGS. 3 and 6 show an example of a hovercraft trimmed down by the stern when taking a straight course. In this case, the two rudder elements 11, 12 are swivelled upwards by the same amount. Thus, the air jets of both engines 2, 3 are deflected upwards according to the position of the rudder elements 11, 12, causing the stern of the hovercraft to be lowered. Likewise, a shift in the centre of gravity towards the bows could be compensated for by the above-mentioned setting of the rudder elements 11, 12 generating a force component which counters the shift in the centre of gravity. In this case, the rudder elements 11, 12 must be swivelled upwards until the hovercraft assumes a horizontal position in relation to the ground or the surface of the water. If the hovercraft is to be trimmed down by the head (FIG. 5), both rudder elements 11, 12 are swivelled downwards, so that a force component is generated which raises the stern. In this case, both rudder elements 11, 12 must again be continuously swivelled downwards until the hovercraft reaches a horizontal position.

In both cases, this setting of the rudder elements 11, 12 is also maintained when taking a curve course, and is added to the rudder angles necessary for executing the curve course.

Figure 4:
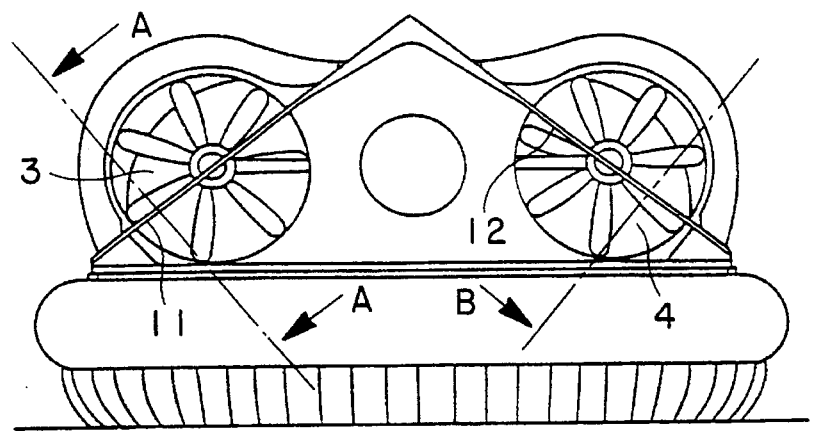
FIG. 4 A rear view of the hovercraft in normal position without trimming.

FIGS. 7 to 11 show schematic sectional views of the swivelling range of the rudder elements 11, 12 for executing manoeuvres. In this context, rudder element 11 is depicted along Line A—A and rudder element 12 is depicted along Line B—B in FIG. 4.

Figure 7:
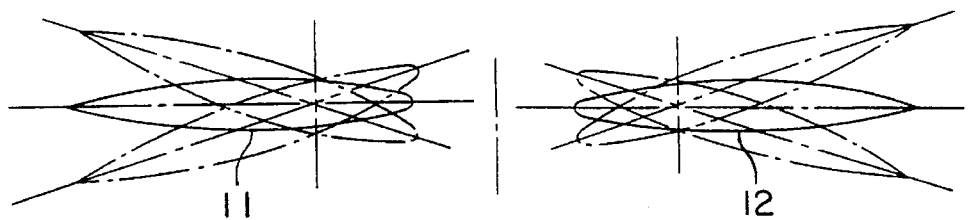
FIG. 7 The position of the rudder elements without trimming and their swivelling range.
Figure 8:
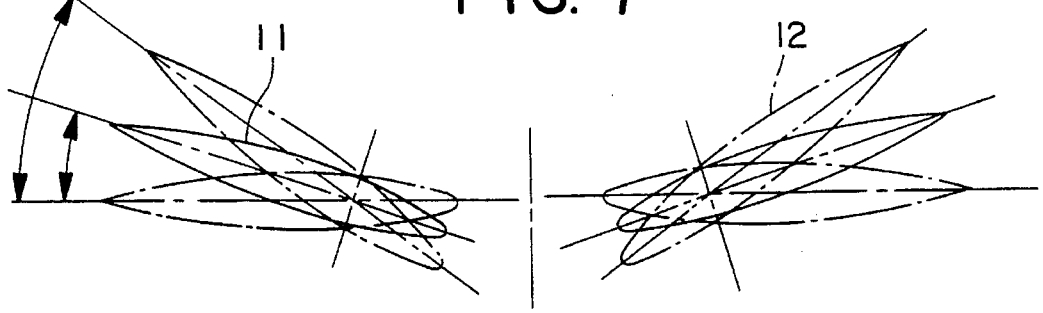
FIG. 8 The position of the rudder elements with the hovercraft trimmed down by the stern.
Figure 9:
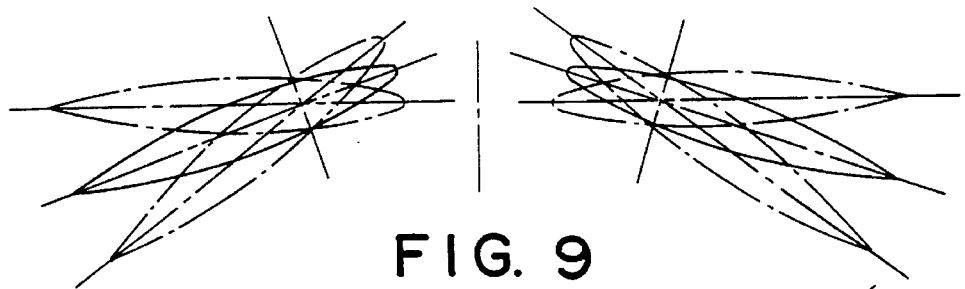
FIG. 9 The position of the rudder elements with the hovercraft trimmed down by the head.
Figure 10:
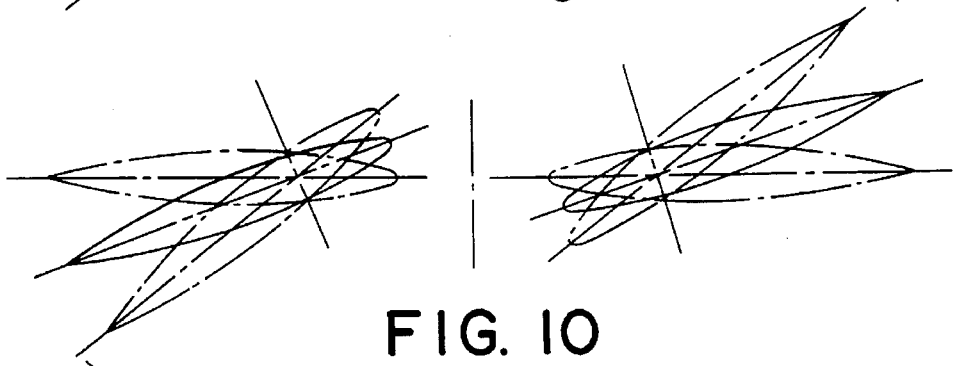
FIG. 10 The position of the rudder elements with the hovercraft trimmed to starboard.

FIG. 7 shows both rudder elements 11, 12 in their neutral positions and the swivelling range possible for taking curves. In this context, the hovercraft is not trimmed about one of the axes of stability. If, for example, the hovercraft is to be trimmed down by the stern, both rudder elements 11, 12 must be swivelled upwards from their neutral position (FIG. 8). The position of the rudder elements 11, 12 now reached then represents their new neutral position, about which the rudders must be swivelled within their swivelling range in order to take curves. This means that the rudder angles required for trimming the hovercraft are added as a constant amount to the rudder angles for taking curves. If the hovercraft needs to be trimmed down by the bows (FIG. 9), the rudder elements 11, 12 must be swivelled downwards in a manner similar to that described above.

Figure 11:
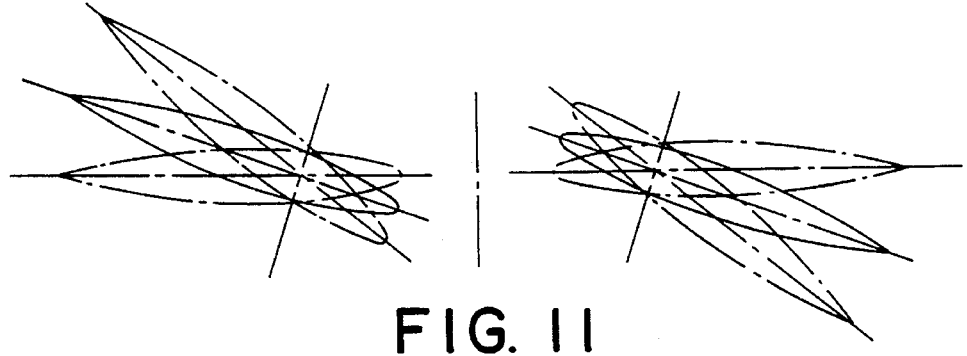
FIG. 11 The position of the rudder elements with the hovercraft trimmed to port.

If, for example, the hovercraft is to be trimmed down to starboard (FIG. 10), the left-hand rudder element 11 must be swivelled downwards and the right-hand rudder element 12 swivelled upwards by the same amount. The additional rudder angles required for taking a curve course are then added to the new basic setting. A similar procedure applies when trimming the hovercraft down to port (FIG. 11).

The above-mentioned types of trimming of the hovercraft can, of course, be combined with each other in order to simultaneously trim the craft about all axes of stability.

We claim:

1. Trim compensation for a hovercraft having two engines (2, 3), the two engines each having flow outlet apertures and arranged laterally at a stern of the hovercraft to generate air jets for forward motion, the hovercraft further including a compressor to generate an air-cushion beneath the hovercraft, the trim compensation comprising:

a tail plane arrangement located in the air jets of the engines for directional control of the hovercraft by deflection of the air jets, the tail plane arrangement includes a negatively arranged V-plane (7) having a middle upper section, the middle upper section having two oppositely positioned stabilizer surfaces (9, 10) extending downwardly from the middle upper section and each of the stabilizer surfaces (9, 10) are fitted with a rudder element (11, 12) which are swingable in the same or opposite direction to deflect the air jets;

wherein the stabilizer surfaces (9, 10) and the rudder elements (11, 12) run centrally across each of the flow outlet apertures of the engines (2, 3); and wherein the rudder elements (11, 12) are swivelled about an axis of rotation in addition to the directional control to produce an additional force component for trim compensation which is generated by the deflection of the air jets of the engines (2, 3) and which is constantly superimposed on the directional control.

2. Trim compensation for the hovercraft as claimed in claim 1 wherein the stabilizer surfaces (9, 10) and the rudder elements (11, 12) extend across a diameter of the flow outlet apertures of the engines (2, 3).

3. Trim compensation for the hovercraft as claimed in claim 2 wherein the rudder elements (11, 12) have a symmetrical profile with a thickest portion at a middle section of the rudder elements (11, 12) and wherein the axis of rotation passes through the thickest part of the rudder elements (11, 12).

4. Trim compensation for the hovercraft as claimed in claim 1 wherein the middle upper section of the negatively arranged V-plane (7) is designated as a stabilizing nose (8) which protrudes beyond a bodywork (1) of the hovercraft.

5. Trim compensation for the hovercraft as claimed in claim 1 wherein one of the air jets of the engines (2, 3) is deflected while the hovercraft is stationary by swivelling a corresponding one of the rudder elements (11, 12) while the hovercraft is stationary or moving slowly until the hovercraft reaches a horizontal position.

6. Trim compensation for the hovercraft as claimed in claim 1 wherein the air jets of the engines (2, 3) are deflected by swivelling the rudder elements (11, 12) while the hovercraft is stationary or moving slowly until the hovercraft reaches a horizontal position.

7. Trim compensation for the hovercraft as claimed in claim 1 wherein the hovercraft is trimmed about a transverse axis of stability by setting the rudder elements (11, 12) of the negatively arranged V-plane (7) and thereby the air jets of the engines (2, 3) in a same direction.

8. Trim compensation for the hovercraft as claimed in claim 1 wherein the hovercraft is trimmed about a longitudinal axis of stability by setting the rudder elements (11, 12) of the negatively arranged V-plane (7) and thereby the air jets of the engines (2,3) in an opposite direction.

9. Trim compensation for the hovercraft as claimed in claim 1 wherein the hovercraft is trimmed by simultaneously setting the rudder elements (11, 12) of the negatively arranged V-plane (7) and thereby the air jets of the engines (2, 3) in a same direction and in an opposite direction.

* * * * *